United States Patent
Park et al.

(10) Patent No.: US 8,586,247 B2
(45) Date of Patent: Nov. 19, 2013

(54) POSITIVE ELECTRODE ACTIVE MATERIAL COMPRISING AN AGGLOMERATION OF AT LEAST TWO PRIMARY PARTICLES FOR LITHIUM BATTERY AND LITHIUM BATTERY USING THE SAME

(75) Inventors: Do-Hyung Park, Yongin-si (KR);
Seon-Young Kwon, Yongin-si (KR);
Min-Han Kim, Yongin-si (KR);
Ji-Hyun Kim, Yongin-si (KR);
Chang-Hyuk Kim, Yongin-si (KR);
Yoon-Chang Kim, Yongin-si (KR);
Jeong-Seop Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 376 days.

(21) Appl. No.: 12/958,332

(22) Filed: Dec. 1, 2010

(65) Prior Publication Data
US 2011/0143209 A1  Jun. 16, 2011

Related U.S. Application Data

(60) Provisional application No. 61/285,785, filed on Dec. 11, 2009.

(51) Int. Cl.
*H01M 4/58* (2010.01)
*H01M 4/525* (2010.01)
*H01M 4/50* (2010.01)
*H01M 4/52* (2010.01)
*H01M 4/1391* (2010.01)
*C01G 45/02* (2006.01)

(52) U.S. Cl.
USPC .................. 429/231.95; 429/231.3; 429/224; 429/223; 252/182.1; 423/594.4; 423/594.6; 423/605

(58) Field of Classification Search
USPC .............. 429/231.95, 231.1, 231.3, 223, 232, 429/221, 218.1, 224; 252/182.1; 423/594.6, 423/594.4, 605
See application file for complete search history.

(56) References Cited

U.S. PATENT DOCUMENTS

| | | | | |
|---|---|---|---|---|
| 5,348,824 A | * | 9/1994 | Duval | 429/307 |
| 5,498,494 A | * | 3/1996 | Takeuchi et al. | 429/219 |
| 6,258,483 B1 | * | 7/2001 | Abe | 429/223 |
| 7,927,743 B2 | | 4/2011 | Inoue et al. | |
| 8,029,930 B2 | | 10/2011 | Hamano et al. | |

(Continued)

FOREIGN PATENT DOCUMENTS

| | | |
|---|---|---|
| EP | 1 432 055 A2 | 6/2004 |
| EP | 2 207 227 A1 | 7/2010 |

(Continued)

OTHER PUBLICATIONS

Japanese Patent Office action dated Dec. 21, 2012 for corresponding application No. JP 2010-274540 (3 pages).

(Continued)

*Primary Examiner* — Kenneth Douyette
(74) *Attorney, Agent, or Firm* — Christie, Parker & Hale, LLP (57) ABSTRACT

A positive electrode active material for lithium batteries includes secondary particles having primary particles and an amorphous material. A method of manufacturing the positive electrode active material includes mixing a lithium composite oxide and a lithium salt, and heat treating the mixture. A positive electrode includes the positive electrode active material, and a lithium battery includes the positive electrode.

18 Claims, 5 Drawing Sheets

(56) References Cited

U.S. PATENT DOCUMENTS

| | | | |
|---|---|---|---|
| 2002/0037455 A1* | 3/2002 | Tani et al. | 429/223 |
| 2003/0146988 A1 | 8/2003 | Shiraishi | |
| 2003/0215717 A1* | 11/2003 | Miyaki | 429/232 |
| 2004/0110065 A1* | 6/2004 | Hamano et al. | 429/231.3 |
| 2004/0234853 A1 | 11/2004 | Adachi et al. | |
| 2009/0081550 A1 | 3/2009 | Inoue et al. | |
| 2010/0221613 A1 | 9/2010 | Ueki et al. | |
| 2010/0261061 A1 | 10/2010 | Yuasa et al. | |

FOREIGN PATENT DOCUMENTS

| | | | | |
|---|---|---|---|---|
| JP | 2000-323123 A | 11/2000 | | |
| JP | 2003-232984 | 8/2003 | | |
| JP | 2004-265806 A | 9/2004 | | |
| JP | 2007-048525 A | 2/2007 | | |
| JP | 2007-48692 | 2/2007 | | |
| JP | 2007-123255 A | 5/2007 | | |
| JP | 2007-128723 | 5/2007 | | |
| JP | 2009-76383 | 4/2009 | | |
| JP | 2009-99462 A | 5/2009 | | |
| JP | 2009-146739 | 7/2009 | | |
| JP | 2009-266712 A | 11/2009 | | |
| JP | 2011-124086 A | 6/2011 | | |
| KR | 10-2004-0032960 | 4/2004 | | |
| KR | 10-2004-0049811 | 6/2004 | | |
| WO | WO-9748645 A1 * | 12/1997 | | C01G 53/00 |
| WO | WO 2006/033529 A1 | 3/2006 | | |
| WO | WO 2009/060603 A1 | 5/2009 | | |

OTHER PUBLICATIONS

Machine English Translation of JP 2009-146739.

KIPO Office action dated Aug. 31, 2012 in Korean application No. 10-2010-0124860 (6 pps).

Extended Search Report dated Mar. 22, 2011, for corresponding European Patent Application No. 10252105.1-1227.

English machine translation of Japanese Publication No. 2007-128723, listed above, 151 pages.

* cited by examiner

POSITIVE ELECTRODE ACTIVE MATERIAL COMPRISING AN AGGLOMERATION OF AT LEAST TWO PRIMARY PARTICLES FOR LITHIUM BATTERY AND LITHIUM BATTERY USING THE SAME

CROSS-REFERENCE TO RELATED APPLICATION

This application claims priority to and the benefit of U.S. Provisional Patent Application No. 61/285,785, filed on Dec. 11, 2009, the entire content of which is incorporated herein by reference.

BACKGROUND

1. Technical Field

One or more embodiments of the present invention relate to positive electrode active materials for lithium batteries, methods of manufacturing the positive electrode active materials, and lithium batteries including the positive electrode active materials.

2. Description of Related Art

Recently, lithium secondary batteries are being used as power sources for portable compact electronic devices. Lithium secondary batteries have high energy density because they use organic electrolytes, and thus the discharge voltages of the lithium secondary batteries is two times greater than that of batteries using conventional alkali aqueous electrolyte solutions.

In lithium secondary batteries, materials capable of absorbing and desorbing lithium ions are used in the negative electrode and the positive electrode, and an organic electrolytic solution or a polymer electrolytic solution fills the space between the positive electrode and negative electrode. When lithium ions are absorbed or desorbed, an oxidation reaction and a reduction reaction occur, respectively, and due to the oxidation reaction and the reduction reaction, electric energy is generated.

$LiCoO_2$ is widely used as a positive electrode active material for lithium secondary batteries. However, $LiCoO_2$ is expensive and its supply is unreliable. Thus, alternatives (such as composites including nickel or manganese) are being developed for use as a positive electrode active material.

However, the residual capacity, recovery capacity, and thermal stability of conventional positive electrode active materials are unsatisfactory.

SUMMARY

Accordingly to one or more embodiments of the present invention, a positive electrode active material for lithium batteries is capable of improving capacity and thermal stability. In other embodiments, a method of manufacturing the positive electrode active material is provided.

In one or more embodiments of the present invention, a lithium battery includes the positive electrode active material.

According to one or more embodiments of the present invention, a positive electrode active material for lithium batteries includes secondary particles including primary particles and an amorphous material. The composition of the primary particles is a lithium composite oxide.

According to one or more embodiments of the present invention, a method of manufacturing a positive electrode active material for lithium batteries includes: mixing and stirring a lithium composite oxide and a lithium salt; and heat treating the resultant at a temperature from greater than about 700° C. to about 950° C. or less. The positive electrode active material includes at least one secondary particle which includes an agglomeration of at least two primary particles, and an amorphous material. The composition of the primary particles is a lithium composite oxide.

According to one or more embodiments of the present invention, a lithium battery includes a positive electrode, a negative electrode, and a separator between the positive electrode and the negative electrode. The positive electrode includes the positive electrode active material.

A positive electrode active material for lithium batteries according to an embodiment of the present invention includes at least two primary particles having an average diameter that is controlled to reduce the specific surface area of the positive electrode active material that is exposed to the electrolyte. Thus, the positive electrode active material imparts good thermal stability and high residual capacity at high temperatures, while also preserving capacity at high temperatures.

DETAILED DESCRIPTION

A positive electrode active material for lithium batteries includes at least one secondary particle including an agglomeration of at least two primary particles, and an amorphous material. The primary particles are composed of a lithium composite oxide.

The amorphous material may be present along a grain boundary of adjacent primary particles, and/or be present as an amorphous material layer. As used herein, the term "grain boundary" refers to the interface between two adjacent primary particles. The grain boundary of adjacent primary particles may be present inside the secondary particle.

As used herein, the term "primary particles" refers to particles that agglomerate together to form a secondary particle, and may take various shapes such as rods or squares. As used herein, the term "secondary particles" refer to particles that do not agglomerate, and are generally spherical in shape.

The amorphous material may be a lithium salt, but is not limited thereto.

The lithium salt may be lithium sulfate, lithium nitrate, lithium carbonate or lithium hydroxide.

The amount of the amorphous material may be about 0.01 to about 10 parts by weight based on 100 parts by weight of the lithium composite oxide. For example, the amount of the amorphous material may be about 0.1 to about 2 parts by weight based on 100 parts by weight of the lithium composite oxide If the amount of the amorphous material is between about 0.01 to about 10 parts by weight, the positive electrode active material has high capacity.

The average diameter of the primary particles may be about 1 to about 3 μm, and the average diameter of the secondary particles may be about 10 to about 15 μm. In this regard, the average diameters are measured using a laser diffraction-type particle distribution evaluator. If the average diameter of the primary particles is within the above range, the specific surface area positive electrode active material exposed to the electrolyte is reduced, and thus the positive electrode active material has good thermal stability and high capacity. If the average diameter of the secondary particles is within the above range, the positive electrode active material has good thermal stability and high capacity.

According to some exemplary embodiments, the lithium composite oxide may be a compound represented by Formula 1.

Formula 1

In Formula 1, $0.5 \leq x \leq 1$, $0 \leq y \leq 0.5$, $0 < z \leq 0.5$, $0.90 < a \leq 1.15$, and Me is selected from aluminum (Al), manganese (Mn), titanium (Ti), and calcium (Ca). In some embodiments, for example, $0.5 \leq x \leq 0.6$, $0.1 \leq y \leq 0.3$, $0.2 \leq z \leq 0.3$, $0.90 \leq a \leq 1.0$. However, the values of x, y, z, and a are not limited thereto. Nonlimiting examples of lithium composite oxides include $LiNi_{0.5}CO_{0.2}Mm_{0.3}O_2$, or $LiNi_{0.6}CO_{0.2}Mn_{0.2}O_2$.

Figure 1:
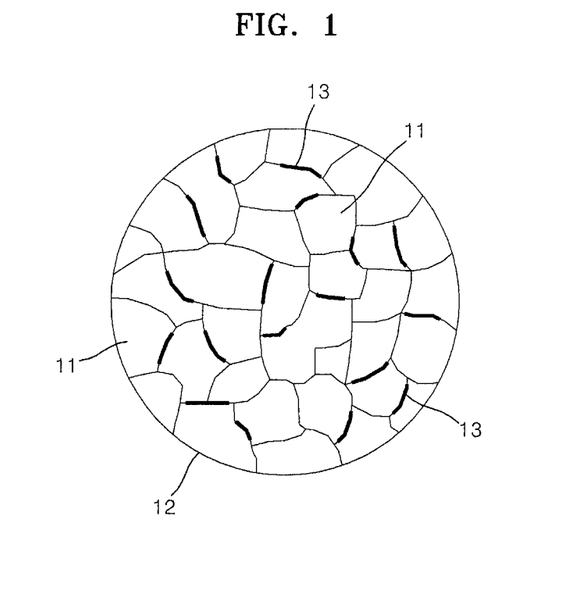
FIG. 1 is a schematic view of a secondary particle of a positive electrode active material for lithium batteries according to an embodiment of the present invention.

FIG. 1 is a cross-sectional schematic view of a secondary particle 12 included in a positive electrode active material for lithium batteries according to an embodiment of the present invention. Referring to FIG. 1, primary particles 11 agglomerate to form the secondary particle 12, and an amorphous material 13 (for example, lithium sulfate) is present along a grain boundary of the primary particles 11 at the surface of the secondary particle 12.

Hereinafter, a method of manufacturing the positive electrode active material, according to an embodiment of the present invention will be described. First, a lithium composite oxide and a lithium salt are mixed and then heat treated. The heat treatment may be performed under an air atmosphere or an oxygen atmosphere.

The lithium salt may be a lithium carbonate ($Li_2CO_3$), a lithium sulfate ($Li_2SO_4$), a lithium nitrate ($LiNO_3$), or a lithium hydroxide (LiOH).

The amount of the lithium salt may be controlled such that the amount of the lithium salt in the positive electrode active material is about 0.01 to about 10 parts by weight based on 100 parts by weight of the lithium composite oxide. For example, the amount of the lithium salt may be about 1 to about 1.1 mole based on 1 mole of the lithium composite oxide. For example, the amount of the lithium salt may be about 1 to about 1.05 mole based on 1 mole of the lithium composite oxide. If the amount of the lithium salt is between about 0.01 to about 10 parts by weight based on 100 parts by weight of the lithium composite oxide, the positive electrode active material has good thermal stability and high capacity.

The heat treatment temperature may be from greater than about 700° C. to about 950° C. or less. For example, the heat treatment temperature may be from about 750° C. to about 900° C. In some embodiments, for example, the heat treatment temperature is from about 800° C. to about 900° C. If the heat treatment temperature is from greater than about 700° C. to about 950° C. or less, the positive electrode active material including the amorphous material may be obtained.

The amorphous material included in the positive electrode active material prepared as described above may be identified with a diffraction pattern obtained using a transmission electron microscope (TEM).

In the positive electrode active material, the amorphous material increases the diameters of the primary particles by acting as a flux, but the active material maintains the capacity characteristics of the lithium composite oxide primary particles during heat treatment. When the diameters of the primary particles are increased, the specific surface area of the positive electrode active material exposed to the electrolyte is reduced. Thus, the positive electrode active material has good thermal stability, high residual capacity at high temperatures, and high recovery capacity at high temperatures.

The capacity of the positive electrode active material may be 180 mAh/g or more.

The positive electrode active material may further include a lithium transition metal oxide, which can be any such material generally used in lithium batteries. For example, the lithium transition metal oxide may include at least one material selected from $LiCoO_2$, $LiNiO_2$, $LiMnO_2$, $LiMn_2O_4$, $Li(Ni_aCO_bMn_c)O_2$ (where $0<a<1$, $0<b<1$, $0<c<1$, and $a+b+c=1$), $LiNi_{1-Y}CO_YO_2$, $LiCo_{1-Y}Mn_YO_2$, $LiNi_{1-Y}Mn_YO_2$ (where $0 \leq Y < 1$), $LiMn_{2-Z}Ni_ZO_4$, $LiMn_{2-Z}Co_ZO_4$ (where $0<Z<2$), $LiCoPO_4$, and $LiFePO_4$.

According to an embodiment of the present invention, the lithium transition metal oxide may be, for example, $LiCoO_2$.

The amount of the lithium transition metal oxide may be about 0.1 to about 90 parts by weight based on 100 parts by weight of the positive electrode active material including the secondary particles and the amorphous material. If the amount of the lithium transition metal oxide is within the range described above, the positive electrode active material has high capacity.

Hereinafter, a method of manufacturing a lithium battery including the positive electrode active material will be described. A lithium secondary battery includes a positive electrode according to an embodiment of the present invention, a negative electrode, a lithium salt-containing non-aqueous electrolyte, and a separator.

The positive electrode is manufactured by coating and drying a composition for forming a positive electrode active material layer on a collector, and the negative electrode is manufactured by coating and drying a composition for forming a negative electrode active material layer on a collector.

The composition for forming a positive electrode active material layer may be prepared by mixing the positive electrode active material described above, a conducting agent, a binder, and a solvent. The positive electrode active material may be used together with lithium transition metal oxides (which are generally used as positive electrode active materials for lithium batteries) as described above.

The binder is a component that enhances the binding of the positive electrode active material to the conducting agent or to the collector. The amount of the binder may be about 1 to about 50 parts by weight based on 100 parts by weight (the total weight) of the positive electrode active material. Nonlimiting examples of the binder include polyvinylidenefluoride, polyvinylalcohol, carboxymethylcellulose(CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, and various copolymers. The amount of the binder may be about 2 to about 5 parts by weight based on 100 parts by weight of the positive electrode active material. If the amount of the binder is within the range described above, the positive active material layer is more strongly attached to the collector.

The conducting agent may be any conducting material that does not cause chemical changes in batteries. Nonlimiting examples of the conducting agent include graphite, such as natural graphite or artificial graphite; carbonaceous materials, such as carbon black, acetylene black, ketjen black, channel black, furnace black, lamp black, or summer black; conducting fibers, such as carbonaceous fibers or metal fibers; metal powders, such as carbon fluoride powders, aluminum powders, or nickel powders; conducting whiskers, such as zinc oxide or potassium titanate; conducting metal oxides such as titanium oxide; and conducting materials such as polyphenylene derivatives.

The amount of the conducting agent may be about 2 to about 5 parts by weight based on 100 parts by weight (the total weight) of the positive electrode active material. If the amount of the conducting agent is inside the range described above, the resultant electrode has high conductivity.

One nonlimiting example of the solvent is N-methylpyrrolidone.

The amount of the solvent may be about 1 to about 10 parts by weight based on 100 parts by weight (the total weight) of the positive electrode active material. If the amount of the solvent is within the range described above, the positive active material layer may be easily formed.

The collector that is used to form the positive electrode may have a thickness of about 3 to about 500 µm, and may be formed using any material that does not cause chemical changes in batteries and has high conductivity. The collector may be formed of stainless steel, aluminum, nickel, titanium, heat treated carbon, or aluminum. Alternatively, the collector may be a stainless steel support that is surface-treated with carbon, nickel, titanium, or silver. The collector may have a corrugated surface to facilitate a stronger attachment of the positive electrode active material to the collector. The collector may take various forms, such as a film, a sheet, a foil, a net, a porous product, a foam, or a nonwoven fabric.

Separately, the composition for forming a negative electrode active material layer is prepared by mixing a negative electrode active material, a binder, a conducting agent, and a solvent. The negative electrode active material may be a material capable of absorbing or desorbing lithium ions. Nonlimiting examples of the negative electrode active material include carbonaceous materials such as graphite or carbon, lithium metal, alloys, and silicon oxides. According to an embodiment of the present invention, the negative electrode active material may be silicon oxide.

The amount of the binder may be about 1 to about 50 parts by weight based on 100 parts by weight (the total weight) of the negative electrode active material. Nonlimiting examples of the binder include those described above with respect to the positive electrode.

The amount of the conducting agent may be about 1 to about 5 parts by weight based on 100 parts by weight (the total weight) of the negative electrode active material. If the amount of the conducting agent is inside the range described above, the resultant electrode has high conductivity.

The amount of the solvent may be about 1 to about 10 parts by weight based on 100 parts by weight of the total weight of the negative electrode active material. If the amount of the solvent is within the range described above, the negative active material layer may be easily formed.

Nonlimiting examples of the conducting agent and the solvent include those discussed above with respect to the positive electrode.

The collector that is used to form the negative electrode may have a thickness of about 3 to about 500 µm. The negative electrode may be formed using any material that does not cause chemical changes in batteries and has high conductivity. The collector may be formed of copper, stainless steel, aluminum, nickel, titanium, heat treated carbon, or aluminum. Alternatively, the negative electrode collector may be a stainless steel support that is surface-treated with carbon, nickel, titanium, or silver. The collector may have a corrugated surface to facilitate a stronger attachment of the negative electrode active material to the collector. The collector may take various forms, such as a film, a sheet, a foil, a net, a porous product, a foam, or a nonwoven fabric.

The separator is placed between the positive electrode and the negative electrode. The separator may have an average pore diameter of about 0.01 to about 10 µm, and a thickness of about 5 to about 300 µm. The separator may be a sheet or a nonwoven fabric formed of an olefin-based polymer such as polypropylene or polyethylene, or glass fiber. If the electrolyte used is a solid electrolyte such as a polymer, the solid electrolyte may also act as the separator.

The lithium salt-containing non-aqueous electrolyte may include a non-aqueous electrolyte and lithium. The non-aqueous electrolyte may be a non-aqueous electrolytic solution, an organic solid electrolyte, or an inorganic solid electrolyte.

Nonlimiting examples of the non-aqueous electrolytic solution include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethylsulfoxide, 1,3-dioxolane, formamide, dimethyl formamide, dioxolane, acetonitrile, nitromethane, methyl formate, methyl acetate, trimethyl phosphate, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Nonlimiting examples of the organic solid electrolyte include polyethylene derivatives, polyethylene oxide derivatives, polypropylene oxide derivatives, phosphate ester polymers, polyester sulfide, polyvinyl alcohol, and polyvinylidene fluoride.

Nonlimiting examples of the inorganic solid electrolyte include nitrates, halides, and sulfates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be a material that is easily dissolved in the non-aqueous electrolyte, and may be, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $LiCH_3SO_3$, $LiCF_3SO_3$, $LiN(CF_3SO_2)_2$, lithium chloroborate, lower aliphatic lithium carbonic acids, phenyl lithium tetraborate, or a lithium imide.

Figure 2:
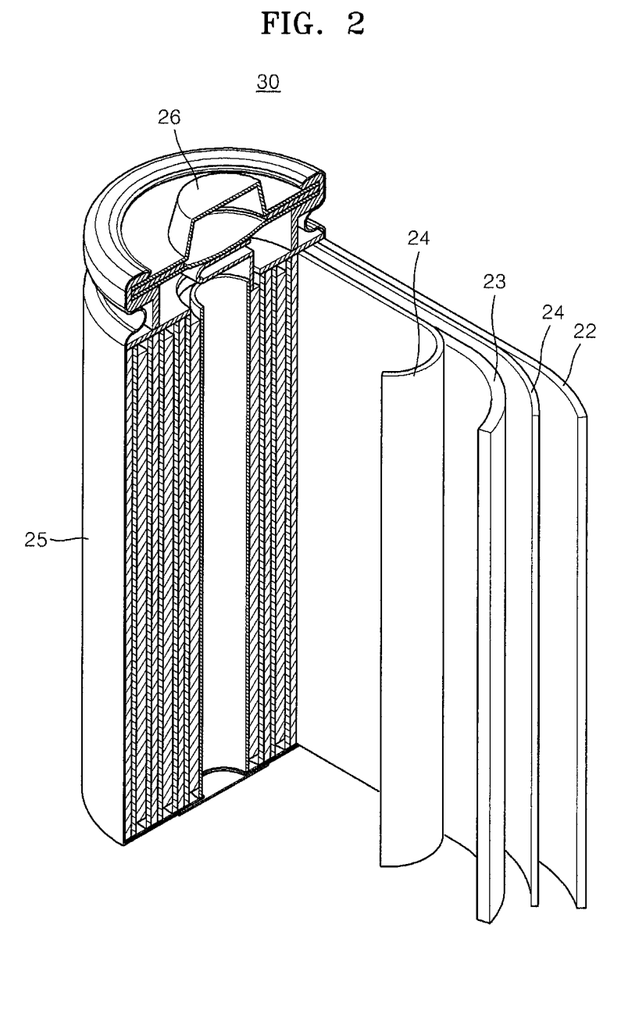
FIG. 2 is a cross-sectional schematic view of a lithium battery according to an embodiment of the present invention.

FIG. 2 is a cross-sectional schematic view of a lithium battery 30 according to an embodiment of the present invention. Referring to FIG. 2, the lithium battery 30 includes a positive electrode 23, a negative electrode 22, a separator 24 between the positive electrode 23 and the negative electrode 22, a battery case 25, and a sealing member 26 for sealing the battery case 25. The positive electrode 23, the negative electrode 22, and the separator 24 are impregnated with an electrolyte (not shown). The lithium battery 30 is formed by sequentially stacking the positive electrode 23, the separator 24, and the negative electrode 22 and then winding the stack structure to form an electrode assembly which is placed in the battery case 25. The battery case 25 is then sealed with the sealing member 26 to complete the battery 30.

The following examples are presented for illustrative purposes only and do not limit the purpose and scope of the present invention.

Preparation Example 1

Preparation of Positive Electrode Active Material 0.5 g of lithium sulfate ($Li_2SO_4$) was added to 100 g of $LiNi_{0.6}Co_{0.2}Mn_{0.2}O_2$ (a lithium composite oxide) and the mixture was stirred.

The resultant was heat treated at a temperature of 800° C. under an air atmosphere, thereby forming a positive electrode active material including at least one secondary particle including a $Li_2SO_4$ amorphous layer formed along a grain boundary of adjacent primary particles.

Preparation Example 2

Preparation of Positive Electrode Active Material

A positive electrode active material was prepared in the same manner as in Preparation Example 1, except that the heat treatment temperature was 900° C. instead of 800° C.

Preparation Example 3

Preparation of Positive Electrode Active Material

A positive electrode active material was prepared in the same manner as in Preparation Example 1, except that the heat treatment temperature was 750° C. instead of 800° C.

Preparation Example 4

Preparation of Positive Electrode Active Material

A positive electrode active material was prepared in the same manner as in Preparation Example 1, except that the heat treatment temperature was 950° C. instead of 800° C.

Preparation Example 5

Preparation of Positive Electrode Active Material

A positive electrode active material was prepared in the same manner as in Preparation Example 1, except that 0.1 g of $Li_2SO_4$ was used.

Preparation Example 6

Preparation of Positive Electrode Active Material

A positive electrode active material was prepared in the same manner as in Preparation Example 1, except that the heat treatment temperature was 850° C. instead of 800° C.

Comparative Preparation Example 1

Preparation of Positive Electrode Active Material

A positive electrode active material was prepared in the same manner as in Preparation Example 1, except that the heat treatment temperature was 1000° C. instead of 800° C.

Comparative Preparation Example 2

Preparation of Positive Electrode Active Material

A positive electrode active material was prepared in the same manner as in Preparation Example 1, except that the heat treatment temperature was 650° C. instead of 800° C.

Figure 3:
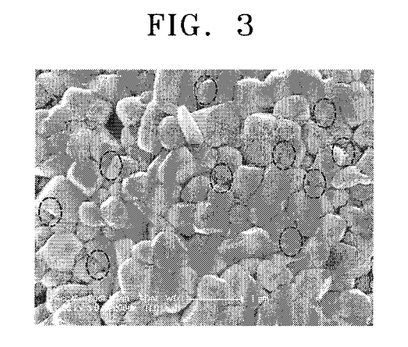
FIG. 3 is a scanning electron microscope (SEM) image of a positive electrode active material prepared according to Preparation Example 1.
Figure 4:
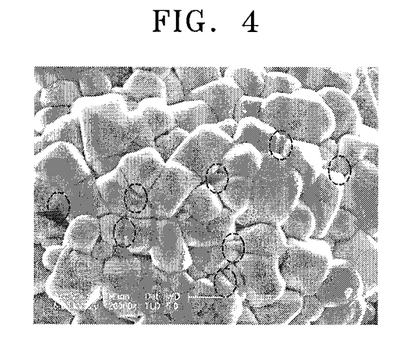
FIG. 4 is a SEM image of a positive electrode active material prepared according to Preparation Example 2.
Figure 5:
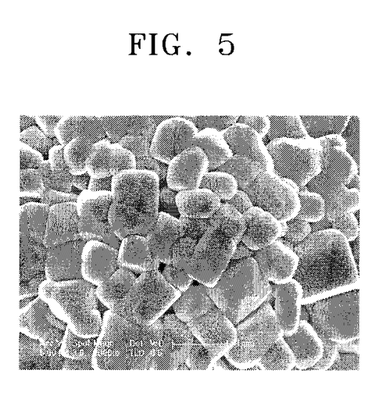
FIG. 5 is a SEM image of a positive electrode active material prepared according to Comparative Preparation Example 1.

The positive electrode active materials prepared according to Preparation Examples 1 and 2 and Comparative Preparation Example 1 were analyzed using a scanning electron microscope (SEM) (at about 40,000 magnification), and the magnified images are shown in FIGS. 3 through 5.

FIGS. 3 and 4 are SEM images of the positive electrode active materials prepared according to Preparation Example 1 and Preparation Example 2, respectively, and FIG. 5 is a SEM image of the positive electrode active material prepared according to Comparative Preparation Example 1.

Referring to FIGS. 3 through 5, it can be seen that the positive electrode active materials prepared according to Preparation Example 1 and Preparation Example 2 include an amorphous layer formed of lithium sulfate between adjacent primary particles, and the positive electrode active material prepared according to Comparative Preparation Example 1 does not include an amorphous layer between adjacent primary particles.

With regard to the positive electrode active materials prepared according to Preparation Examples 1 through 5 and Comparative Preparation Example 1, an average diameter of the primary particles and an average diameter of the secondary particles were measured. The results are shown in Table 1. The average diameters of the primary particles and secondary particles were measured using the SEM images of the positive electrode active materials.

TABLE 1

| | Average diameter of primary particles (nm) | Average diameter of secondary particles (nm) |
|---|---|---|
| Preparation Example 1 | 500 nm | 12 |
| Preparation Example 2 | 1000 nm | 13 |
| Preparation Example 3 | 350 nm | 12 |
| Preparation Example 4 | 1200 nm | 12 |
| Preparation Example 5 | 400 nm | 12 |
| Comparative Preparation Example 1 | 1800 nm | 13 |

Referring to Table 1, it can be seen that the average diameter of the primary particles increases with the heat treatment temperature. In addition, it can also be seen that the average diameter of the primary particles increases as the amount of lithium sulfate increases.

The thermal stability of the positive electrode active materials prepared according to Preparation Example 1 and Comparative Preparation Example 1 was evaluated using a differential scanning calorimeter. The evaluation results are shown in FIG. 6.

Figure 6:
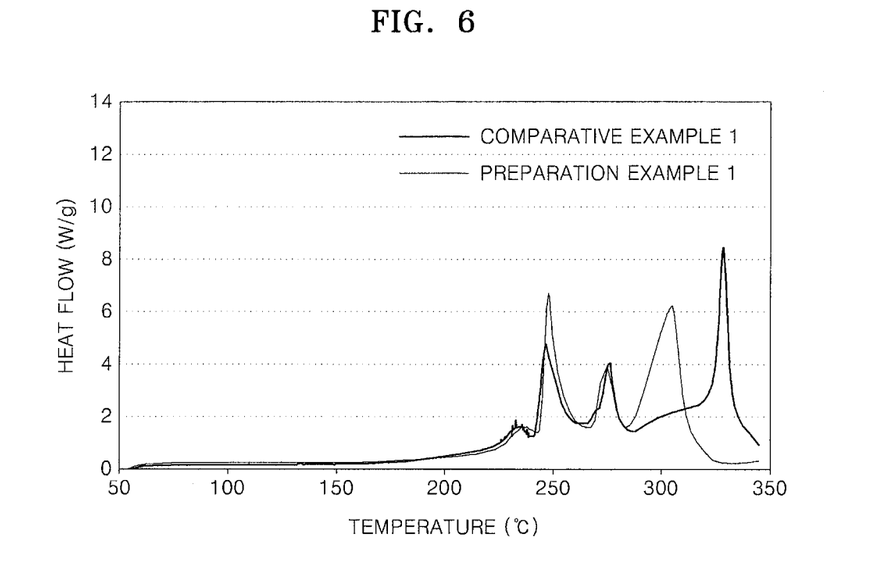
FIG. 6 is a graph comparing the results of differential scanning calorimetry analyses of the positive electrode active materials material prepared according to Preparation Example 1 and Comparative Preparation Example 1.

Referring to FIG. 6, the positive electrode active material of Preparation Example 1 emits less heat than the positive electrode active material of Comparative Preparation Example 1. Thus, it can be seen that the thermal stability of the positive electrode active material of Preparation Example 1 is improved.

Example 1

Manufacturing of Positive Electrode and Lithium Secondary Battery Including the Same 4.75 g of the positive electrode active material prepared according to Preparation Example 1, 0.15 g of polyvinylidenefluoride, and 0.15 g of a carbon black were dispersed in 2.5 g of N-methylpyrrolidone, thereby preparing a composition for forming a positive electrode active material layer.

The composition was coated on an aluminum foil, thereby forming a thin polar plate having a thickness of 60 μm, and then dried at a temperature of 135° C. for 3 hours or more. The dried polar plate was then pressed, thereby manufacturing a positive electrode.

Separately, a negative electrode was manufactured as follows. SiO and polyvinylidene fluoride were mixed in a weight ratio of 96:4 in N-methylpyrrolidone, thereby preparing a composition for forming a negative electrode active material layer. The composition was coated on a copper foil, thereby forming a thin polar pate having a thickness of 14 μm, and then the formed thin polar pate was dried at a temperature of 135° C. for 3 hours or more and then pressed, thereby manufacturing a negative electrode.

In order to prepare an electrolyte, $LiPF_6$ was added to a solvent including ethylenecarbonate(EC), ethylmethyl carbonate(EMC), and dimethylcarbonate(DMC) in a volume ratio of 1:1:1 to form a 1.3M $LiPF_6$ solution.

A porous polyethylene (PE) film as a separator was disposed between the positive electrode and the negative electrode, thereby forming a battery assembly. The battery assembly was wound and compressed, and the resultant structure was placed in a battery case into which the electrolyte was injected, thereby manufacturing a lithium secondary battery having a capacity of 2600 mAh.

Examples 2-5

Manufacturing of Positive Electrodes and Lithium Secondary Batteries Including the Same Lithium secondary batteries were manufactured in the same manner as in Example 1, except that the positive electrodes were manufactured using the positive electrode active materials prepared according to Preparation Examples 2 through 5, respectively.

Comparative Example 1

Manufacturing of Positive Electrode and Lithium Secondary Battery Including the Same A lithium secondary battery was manufactured in the same manner as in Example 1, except that $Li_{0.6}CO_2Mn_{0.2}O_2$ as a lithium composite oxide was used instead of the positive electrode active material prepared according to Preparation Example 1.

Comparative Example 2

Manufacturing of Positive Electrode and Lithium Secondary Battery Including the Same A lithium secondary battery was manufactured in the same manner as in Example 1, except that the positive electrode active material according to Comparative Preparation Example 1 was used instead of the positive electrode active material prepared according to Preparation Example 1.

Comparative Example 3

Manufacturing of Positive Electrode and Lithium Secondary Battery Including the Same A lithium secondary battery was manufactured in the same manner as in Example 1, except that the positive electrode active material according to Comparative Preparation Example 2 was used instead of the positive electrode active material prepared according to Preparation Example 1.

The residual capacity at high temperatures and recovery capacity at high temperatures of the lithium secondary batteries manufactured according to Examples 1 through 5 and Comparative Examples 1 through 3 were evaluated. The results are shown in Table 2.

The residual capacity at high temperatures and the recovery capacity at high temperatures were evaluated as follows.

Residual Capacity at High Temperature

The batteries were charged at 0.1 C and discharged at a temperature of 60° C., and then charged at 0.5 C and exposed to high temperature for 10 to 15 days. The discharge capacities of the resultant batteries were measured and evaluated.

Recovery Capacity at High Temperature

The batteries were charged at 0.1 C and discharged at a temperature of 60° C., and then charged at 0.5 C and exposed to high temperature for 10 to 15 days. The charge and discharge capacities of the resultant batteries were measured and evaluated.

TABLE 2

|  | Residual capacity (%) | Recovery capacity (%) |
|---|---|---|
| Example 1 | 113 | 103 |
| Example 2 | 117 | 105 |
| Example 3 | 105 | 104 |
| Example 4 | 109 | 103 |
| Example 5 | 108 | 102 |
| Example 6 | 115 | 104 |
| Comparative Example 1 | 100 | 100 |
| Comparative Example 2 | 92 | 95 |
| Comparative Example 3 | 90 | 90 |

Referring to Table 2, it can be seen that the lithium secondary batteries manufactured according to Examples 1-6 have higher residual capacity and recovery capacity than those of Comparative Examples 1-3.

While certain exemplary embodiments have been described, those of ordinary skill in the art will understand that certain modifications and changes to the described embodiments may be made without departing from the spirit and scope of the disclosure, as described in the appended claims.

What is claimed is:

1. A positive active material for a lithium battery, comprising:
   at least one secondary particle comprising an agglomeration of at least two primary particles, wherein the primary particles comprise a lithium composite oxide; and
   an amorphous lithium salt.

2. The positive active material according to claim 1, wherein the amorphous lithium salt is between adjacent primary particles.

3. The positive active material according to claim 2, wherein the amorphous lithium salt is present at least at a grain boundary between adjacent primary particles.

4. The positive active material according to claim 1, wherein the amorphous lithium salt is a lithium carbonate, a lithium sulfate, a lithium nitrate, or a lithium hydroxide.

5. The positive active material according to claim 1, wherein the amorphous lithium salt is present in an amount of about 0.01 to about 10 parts by weight based on 100 parts by weight of the lithium composite oxide.

6. The positive active material according to claim 1, wherein the amorphous lithium salt is present in an amount of about 0.01 to about 10 parts by weight based on 100 parts by weight of the lithium composite oxide.

7. The positive active material according to claim 1, wherein the amorphous lithium salt is present in an amount of about 0.1 to about 2 parts by weight based on 100 parts by weight of the lithium composite oxide.

8. The positive active material according to claim 1, wherein the primary particles have an average particle size of about 1 to about 3 μm.

9. The positive active material according to claim 1, wherein the secondary particles have an average particle size of about 10 to about 15 μm.

10. The positive active material of claim 1, wherein the lithium composite oxide comprises a compound represented by Formula 1:

$$Li_a(Ni_xCo_yMe_z)_{2-a}O_2 \quad \text{Formula 1}$$

wherein $0.5 \leq x \leq 1$, $0 \leq y \leq 0.5$, $0 < z \leq 0.5$, $0.90 < a \leq 1.15$, and Me is selected from the group consisting of Al, Mn, Ti and Ca.

11. The positive active material according to claim 10, wherein $0.5 \leq x \leq 0.6$, $0.2 \leq z \leq 0.3$, $0.90 \leq a \leq 1.0$.

12. The positive active material according to claim 10, wherein the lithium composite oxide is $LiNi_{0.5}Co_{0.2}Mn_{0.3}O_2$ or $LiNi_{0.6}Co_{0.2}Mn_{0.2}O_2$.

13. A method of manufacturing the positive active material of claim 1, the method comprising:
   mixing the lithium composite oxide and the amorphous lithium salt to form a mixture; and
   heat treating the mixture at a temperature of from greater than about 700° C. to about 950° C.

14. The method according to claim 13, wherein the lithium composite oxide comprises a compound represented by Formula 1:

$$Li_xNi_{1-x-y}Co_yMe_zO_2 \quad \text{Formula 1}$$

wherein $0.5 \leq x \leq 1$, $0 \leq y \leq 0.5$, $0 < z \leq 0.5$, $0.90 < a \leq 1.15$, and Me is selected from the group consisting of Al, Mn, Ti and Ca.

15. The method according to claim 13, wherein the heat treating the mixture comprises heating the mixture at a temperature of about 750° C. to about 900° C.

16. The method according to claim 13, wherein the heat treating the mixture comprises heating the mixture at a temperature of about 800° C. to about 900° C.

17. A positive electrode, comprising a positive active material comprising:
   at least one secondary particle comprising an agglomeration of at least two primary particles, wherein the primary particles comprise a lithium composite oxide; and
   an amorphous lithium salt.

18. A lithium battery, comprising:
   a positive electrode comprising a positive active material comprising:
      at least one secondary particle comprising an agglomeration of at least two primary particles, wherein the primary particles comprise a lithium composite oxide; and
      an amorphous lithium salt;
   a negative electrode comprising a negative active material; and
   an electrolyte.

* * * * *

UNITED STATES PATENT AND TRADEMARK OFFICE
CERTIFICATE OF CORRECTION

PATENT NO. : 8,586,247 B2  
APPLICATION NO. : 12/958332  
DATED : November 19, 2013  
INVENTOR(S) : Do-Hyung Park et al.

Page 1 of 1

It is certified that error appears in the above-identified patent and that said Letters Patent is hereby corrected as shown below:

In the Claims

Column 11, line 20, Claim 11    After "$0.5 \leq x \leq 0.6$,"

Insert -- $0.1 \leq y \leq 0.3$, --

Signed and Sealed this  
Sixteenth Day of June, 2015

Michelle K. Lee  
*Director of the United States Patent and Trademark Office*